US007527855B2

(12) United States Patent
Miller et al.

(10) Patent No.: US 7,527,855 B2
(45) Date of Patent: *May 5, 2009

(54) HIGH STRENGTH MONOLITHIC CARBON FOAM

(75) Inventors: Douglas J. Miller, North Olmstead, OH (US); Irwin C. Lewis, Strongsville, OH (US); Robert A. Mercuri, Seven Hills, OH (US)

(73) Assignee: GrafTech International Holdings Inc., Parma, OH (US)

( * ) Notice: Subject to any disclaimer, the term of this patent is extended or adjusted under 35 U.S.C. 154(b) by 529 days.

This patent is subject to a terminal disclaimer.

(21) Appl. No.: 10/970,352

(22) Filed: Oct. 21, 2004

(65) Prior Publication Data

US 2006/0086043 A1    Apr. 27, 2006

(51) Int. Cl.
*B32B 3/26* (2006.01)
(52) U.S. Cl. ............... 428/304.4; 428/310.5; 428/314.8
(58) Field of Classification Search .............. 428/310.5, 428/408; 264/39.1
See application file for complete search history.

(56) References Cited

U.S. PATENT DOCUMENTS

| | | | |
|---|---|---|---|
| 3,121,050 A * | 2/1964 | Ford ............................ 423/448 |
| 3,302,399 A | 2/1967 | Tini et al. ..................... 60/39.7 |
| 3,302,909 A | 2/1967 | Glassman ..................... 248/44 |
| 3,309,437 A | 3/1967 | Harnett ........................ 264/29 |
| 3,342,555 A * | 9/1967 | McMillan ............... 423/445 R |
| 3,387,940 A * | 6/1968 | McHenry et al. ............. 423/448 |
| 3,574,548 A * | 4/1971 | Sands et al. .............. 423/449.6 |
| 3,632,385 A | 1/1972 | Schmitt et al. ................ 117/46 |
| RE28,574 E | 10/1975 | Ruoff .......................... 425/78 |
| 3,960,761 A | 6/1976 | Burger et al. ................ 252/421 |
| 4,190,637 A | 2/1980 | Kennedy .................... 423/448 |
| 4,205,055 A * | 5/1980 | Maire et al. ............. 423/445 R |
| 4,276,246 A * | 6/1981 | Bonzom et al. ............... 264/53 |
| 4,619,796 A | 10/1986 | Awata et al. ............... 264/29.4 |
| 4,681,718 A | 7/1987 | Oldham ...................... 264/102 |
| 4,851,280 A | 7/1989 | Gupta ........................ 428/246 |
| 4,879,182 A | 11/1989 | Presswood et al. .......... 428/408 |
| 4,966,919 A * | 10/1990 | Williams et al. ............... 521/54 |
| 4,992,254 A | 2/1991 | Kong ......................... 423/449 |
| 5,047,225 A | 9/1991 | Kong ....................... 423/447.2 |
| 5,211,786 A | 5/1993 | Enloe et al. .................... 156/89 |
| 5,282,734 A | 2/1994 | Pastureau et al. ............ 425/393 |
| 5,439,864 A * | 8/1995 | Rosin et al. ................. 502/180 |
| 5,648,027 A | 7/1997 | Tajiri et al. .................... 264/43 |
| 5,686,038 A | 11/1997 | Christensen et al. ........ 264/257 |
| 5,709,893 A | 1/1998 | McCarville et al. .......... 425/389 |
| 5,730,915 A | 3/1998 | Cornie ...................... 264/29.1 |
| 5,868,974 A | 2/1999 | Kearns ...................... 264/29.6 |
| 5,888,469 A | 3/1999 | Stiller et al. ................. 423/445 |
| 5,888,649 A | 3/1999 | Curatolo et al. ............. 428/352 |
| 5,937,932 A | 8/1999 | Cornie ....................... 164/526 |
| 5,945,084 A | 8/1999 | Droege ..................... 423/447.4 |
| 5,961,814 A | 10/1999 | Kearns ........................ 208/39 |
| 5,984,256 A | 11/1999 | Endo ........................ 249/114.1 |
| 6,024,555 A | 2/2000 | Goodridge et al. ........... 425/394 |
| 6,033,506 A | 3/2000 | Klett ............................ 156/78 |
| 6,093,245 A | 7/2000 | Hammond et al. ........... 117/200 |
| 6,099,792 A | 8/2000 | Ganguli et al. ............... 264/621 |
| 6,103,149 A | 8/2000 | Stankiewicz ................ 264/29.1 |
| 6,183,854 B1 | 2/2001 | Stiller et al. .............. 428/312.2 |
| 6,217,800 B1 | 4/2001 | Hayward .................... 264/29.1 |
| 6,241,957 B1 | 6/2001 | Stiller et al. ................. 423/448 |
| 6,344,159 B1 | 2/2002 | Klett ......................... 264/29.7 |
| 6,346,226 B1 | 2/2002 | Stiller et al. ................. 423/448 |
| 6,387,343 B1 | 5/2002 | Klett .......................... 423/448 |
| 6,399,149 B1 | 6/2002 | Klett et al. ................... 427/230 |
| 6,506,354 B1 | 1/2003 | Stiller et al. ................. 423/445 |
| 6,576,168 B2 | 6/2003 | Hardcastle et al. .......... 264/29.1 |
| 6,656,238 B1 | 12/2003 | Rogers et al. ................. 44/620 |
| 6,776,936 B2 | 8/2004 | Hardcastle et al. .......... 264/29.1 |
| 6,849,098 B1 | 2/2005 | Joseph et al. .................. 44/620 |
| 2002/0190414 A1 | 12/2002 | Hardcastle et al. |
| 2006/0014908 A1 | 1/2006 | Rotermund et al. |
| 2006/0083673 A1 * | 4/2006 | Morgan et al. ........... 423/445 R |

OTHER PUBLICATIONS

Touchstone Research Laboratory, Ltd., Product Data Sheet: CFOAM Carbon Foams, Rev8-0803.
ORNL High Thermal Conductivity Graphite Foams.
Carbon Graphite Foams at MER Corporation.
POCO Graphite Foam, Properties and Characteristics, Jun. 29, 2001.
Article in High-Performance Composites, Sep. 2004, p. 25.
Modifications of Phenolic Precursor Carbon Foam, R.A. Mercuri and J.M. Criscione, Fuel Deivision of American Chemical Society, 156th Annual Meeting, Proceedings of 9th Carbon Conference, Jun. 16-20, 1969, p. 206.
Preparation and Graphitization of High-Performance Carbon Foams From Coal, Rogers, et al., Touchstone Research Laboratory, Ltd.

(Continued)

*Primary Examiner*—Hai Vo
*Assistant Examiner*—Anish Desai
(74) *Attorney, Agent, or Firm*—Waddey & Patterson PC; James R Cartiglia

(57) ABSTRACT

A carbon foam article useful for, inter alia, composite tooling or other high temperature applications, which includes a carbon foam having a ratio of compressive strength to density of at least about 7000 psi/g/cc.

16 Claims, No Drawings

OTHER PUBLICATIONS

Low-Cost Carbon Foams for Thermal Protection and Reinforcement Applications, Rogers, et al., Touchstone Research Laboratory, pp. 293-305.

Coal-Based Carbon Foam for High Temperature Applications, Dwayne R. Morgan, Touchstone Research Laboratory, Inc.

Precursor Effects on Graphite Foams, Cooling Power Electronics Using Graphite Foams, ORNL Carbon and Graphite Foams.

High Thermal Conductivity, Mesophase Pitch-Derived Carbon Foam, 43rd International SAMPE Symposium, May 31-Jun. 4, 1998, pp. 745, 746.

Microcellular Pitch-Based Carbon Foams Blown with Helium Gas, Anderson, et al., 43rd International SAMPE Symposium, May 31-Jun. 4, 1998, pp. 756, 758, and 760.

High Thermal Conductivity Graphite Foam—Progress and Opportunities, Wiechmann, et al., Composite Optics, Inc.

Performance of Alternate Precursors for Graphite Foam, James Klett and Claudia Walls, Oak Ridge National Laboratory.

Japanese article Structural and thermal characteristics of highly graphitizable AR-Foam by Fumitaka Watanabe and Isao Mochida.

GB-263—Advanced Structural Carbons: Fibers, Foams and Composites, pp. 43-51.

Characterization Requirements for Aerospace Thermal Management Applications, Brow, et al.

Aztex X-Cor, High Performance, Damage Tolerant Composite Core Material, Oct. 2002.

GB Patent Specification 1,489,690, Application No. 28255/75, filed Jul. 4, 1975 titled "Briquetting Coal".

"A Novel Carbon Fiber Based Porous Carbon Monolith" by T.D. Burchell, J.W. Klett, and C.E. Weaver, Proceedings of the Ninth Annual Conference on Fossil Energy Materials, Oak Ridge, TN, May 16-18, 1995.

Kirk-Othmer, Encyclopedia of Chemical Technology, 4th ed., vol. 6, John Wiley & Sons, Application of Coal Petrology and Petrography, pp. 429-434 and 454-455, 1993.

* cited by examiner

HIGH STRENGTH MONOLITHIC CARBON FOAM

BACKGROUND OF THE INVENTION

1. Technical Field

The present invention relates to high strength monolithic carbon foams useful for applications including as composite material tooling. More particularly, the present invention relates to carbon foams exhibiting improved strength, weight and density characteristics. The invention also includes methods for the production of such foams.

2. Background Art

Carbon foams have attracted considerable recent activity because of their properties of low density, coupled with either very high or low thermal conductivity. Conventionally, Carbon foams are prepared by two general routes. Highly graphitizable foams have been produced by thermal treatment of mesophase pitches under high pressure. These foams tend to have high thermal and electrical conductivities. For example, in Klett, U.S. Pat. No. 6,033,506, mesophase pitch is heated while subjected to a pressure of 1000 psi to produce an open-cell foam containing interconnected pores with a size range of 90-200 microns. According to Klett, after heat treatment to 2800° C., the solid portion of the foam develops into a highly crystalline graphitic structure with an interlayer spacing of 0.366 nm. The foam is asserted to have compressive strengths greater than previous foams (3.4 MPa or 500 psi for a density of 0.53 gm/cc).

In Hardcastle et al. (U.S. Pat. No. 6,776,936) carbon foams with densities ranging from 0.678-1.5 gm/cc are produced by heating pitch in a mold at pressures up to 800 psi. The foam is alleged to be highly graphitizable and provide high thermal conductivity (250 W/m°K).

According to H. J. Anderson et al. in Proceedings of the 43d International SAMPE Meeting, p 756 (1998), carbon foam is produced from mesophase pitch followed by oxidative thermosetting and carbonization to 900° C. The foam has an open cell structure of interconnected pores with varying shapes and with pore diameters ranging from 39 to greater than 480 microns.

Rogers et al., in Proceedings of the $45^{th}$ SAMPE Conference, pg 293 (2000), describe the preparation of carbon foams from coal-based precursors by heat treatment under high pressure to give materials with densities of 0.35-0.45 g/cc with compressive strengths of 2000-3000 psi (thus a strength/density ratio of about 6000 psi/g/cc). These foams have an open-celled structure of interconnected pores with pore sizes ranging up to 1000 microns. Unlike the mesophase pitch foams described above, they are not highly graphitizable. In a recent publication, the properties of this type of foam were described (High Performance Composites September 2004, pg. 25). The foam has a compressive strength of 800 psi at a density of 0.27 g/cc or a strength to density ratio of 3000 psi/g/cc.

Stiller et al. (U.S. Pat. No. 5,888,469) describes production of carbon foam by pressure heat treatment of a hydrotreated coal extract. These materials are claimed to have high compressive strengths of 600 psi for densities of 0.2-0.4 gm/cc (strength/density ratio of from 1500-3000 psi/g/cc). It is suggested that these foams are stronger than those having a glassy carbon or vitreous nature which are not graphitizable.

Carbon foams can also be produced by direct carbonization of polymers or polymer precursor blends. Mitchell, in U.S. Pat. No. 3,302,999, discusses preparing carbon foams by heating a polyurethane polymer foam at 200-255° C. in air followed by carbonization in an inert atmosphere at 900° C. These foams have densities of 0.085-0.387 g/cc and compressive strengths of 130 to 2040 psi (ratio of strength/density of 1529-5271 psi/g/cc).

In U.S. Pat. No. 5,945,084, Droege described the preparation of open-celled carbon foams by heat treating organic gels derived from hydroxylated benzenes and aldehydes (phenolic resin precursors). The foams have densities of 0.3-0.9 g/cc and are composed of small mesopores with a size range of 2 to 50 nm.

Mercuri et al. (Proceedings of the $9^{th}$ Carbon Conference, pg. 206 (1969) prepared carbon foams by pyrolysis of phenolic resins. For foams with a density range of 0.1-0.4 gm/cc, the compressive strength to density ratios were from 2380-6611 psi/g/cc. The pores were ellipsoidal in shape with pore diameters of 25-75 microns) for a carbon foam with a density of 0.25 gm/cc.

Stankiewicz (U.S. Pat. No. 6,103,149) prepares carbon foams with a controlled aspect ratio of 0.6-1.2. The patentee points out that users often require a completely isotropic foam for superior properties with an aspect ratio of 1.0 being ideal. An open-celled carbon foam is produced by impregnation of a polyurethane foam with a carbonizing resin followed by thermal curing and carbonization. The pore aspect ratio of the original polyurethane foam is thus changed from 1.3-1.4 to 0.6-1.2.

Unfortunately, carbon foams produced by the prior art processes are not effective for many high temperature applications such as composite tooling. The foams generally available are not monolithic and do not have the strength and strength to density requirements for such application. In addition, open-celled foams with highly interconnected pores have porosities making them ill-placed for such applications.

What is desired, therefore, is a carbon foam which is monolithic and has a controllable cell structure, where the cell structure, strength and strength to density ratio make the foam suitable for use as composite tooling as well as in other applications. Indeed, a combination of characteristics, including strength to density ratios higher than contemplated in the prior art, have been found to be necessary for use of a carbon foam in composite tooling applications. Also desired is a process for preparing such foams.

SUMMARY OF THE INVENTION

The present invention provides a carbon foam which is uniquely capable of use in applications such as for composite tooling. The inventive foam exhibit a density, compressive strength and compressive strength to density ratio to provide a combination of strength and relatively light weight characteristics not heretofore seen. In addition, the monolithic nature and bimodal cell structure of the foam, with a combination of larger and smaller pores, which are relatively spherical, provide a carbon foam which can be produced in a desired size and configuration and which can be readily machined.

More particularly, the inventive carbon foam has a density of about 0.05 to about 0.4 grams per cubic centimeter (g/cc), with a compressive strength of at least about 2000 pounds per square inch (psi) (measured by, for instance, ASTM C695). An important characteristic for the foam when intended for use in a high temperature application is the ratio of strength to density. For such applications, a ratio of strength to density of at least about 7000 psi/g/cc is required, more preferably at least about 8000 psi/g/cc.

The inventive carbon foam should have a relatively uniform distribution of pores in order to provide the required high compressive strength. In addition, the pores should be relatively isotropic, by which is meant that the pores are relatively spherical, meaning that the pores have, on average, an aspect ratio of between about 1.0 (which represents a perfect spherical geometry) and about 1.5. The aspect ratio is determined by dividing the longer dimension of any pore with its shorter dimension.

The foam should have a total porosity of about 65% to about 95%, more preferably about 70% to about 95%. In addition, it has been found highly advantageous to have a bimodal pore distribution, that is, a combination of two average pore sizes, with the primary fraction being the larger size pores and a minor fraction of smaller size pores. Preferably, of the pores, at least about 90% of the pore volume, more preferably at least about 95% of the pore volume should be the larger size fraction, and at least about 1% of the pore volume, more preferably from about 2% to about 10% of the pore volume, should be the smaller size fraction.

The larger pore fraction of the bimodal pore distribution in the inventive carbon foam should be about 10 to about 150 microns in diameter, more preferably about 15 to about 95 microns in diameter, most preferably about 25 to about 95 microns in diameter. The smaller fraction of pores should comprise pores that have a diameter of about 0.8 to about 3.5 microns, more preferably about 1 to about 2 microns. The bimodal nature of the inventive foams provide an intermediate structure between open-celled foams and closed-cell foams, thus limiting the liquid permeability of the foam while maintaining a foam structure. Indeed, advantageously, the inventive carbon foams should exhibit a permeability of no greater than about 3.0 darcys, more preferably no greater than about 2.0 darcys (as measured, for instance, by ASTM C577).

Advantageously, to produce the inventive foams, a polymeric foam block, particularly a phenolic foam block, is carbonized in an inert or air-excluded atmosphere, at temperatures which can range from about 500° C., more preferably at least about 800° C., up to about 3200° C. to prepare carbon foams useful in high temperature applications.

An object of the invention, therefore, is a monolithic carbon foam having characteristics which enable it to be employed in high temperature applications such as composite tooling applications.

Another object of the invention is a carbon foam having the density, compressive strength and ratio of compressive strength to density sufficient for high temperature applications.

Still another object of the invention is a carbon foam having a porosity and cell structure and distribution to provide utility in applications where highly connected porosity is undesirable.

Yet another object of the invention is a carbon foam which can be produced in a desired size and configuration, and which can be readily machined or joined to provide larger carbon foam structures.

Another object of the invention is to provide a method of producing the inventive carbon foam.

These aspects and others that will become apparent to the artisan upon review of the following description can be accomplished by providing a carbon foam article formed of a carbon foam having a ratio of compressive strength to density of at least about 7000 psi/g/cc, especially a ratio of compressive strength to density of at least about 8000 psi/g/cc. The inventive carbon foam advantageously has a density of from about 0.05 to about 0.4 and a compressive strength of at least about 2000 psi, and a porosity of between about 65% and about 95%. The pores of the carbon foam have, on average, an aspect ratio of between about 1.0 and about 1.5.

Preferably, at least about 90% of the pore volume of the pores have a diameter of between about 10 and about 150 microns; indeed, most preferably at least about 95% of the pore volume of the pores have a diameter of between about 25 and about 95 microns. Advantageously, at least about 1% of the pore volume of the pores have a diameter of between about 0.8 and about 3.5 microns, more preferably, from about 2% to about 10% of the pore volume of the pores have a diameter of about 1 to about 2 microns.

The inventive foam can be produced by carbonizing a polymer foam article, especially a phenolic foam, in an inert or air-excluded atmosphere. The phenolic foam should preferably have a compressive strength of at least about 100 psi.

It is to be understood that both the foregoing general description and the following detailed description provide embodiments of the invention and are intended to provide an overview or framework of understanding to nature and character of the invention as it is claimed.

DETAILED DESCRIPTION OF THE PREFERRED EMBODIMENTS

Carbon foams in accordance with the present invention are prepared from polymeric foams, such as polyurethane foams or phenolic foams, with phenolic foams being preferred. Phenolic resins are a large family of polymers and oligomers, composed of a wide variety of structures based on the reaction products of phenols with formaldehyde. Phenolic resins are prepared by the reaction of phenol or substituted phenol with an aldehyde, especially formaldehyde, in the presence of an acidic or basic catalyst. Phenolic resin foam is a cured system composed of open and closed cells. The resins are generally aqueous resoles catalyzed by sodium hydroxide at a formaldehyde:phenol ratio which can vary, but is preferably about 2:1. Free phenol and formaldehyde content should be low, although urea may be used as a formaldehyde scavenger.

The foam is prepared by adjusting the water content of the resin and adding a surfactant (eg, an ethoxylated nonionic), a blowing agent (eg, pentane, methylene chloride, or chlorofluorocarbon), and a catalyst (eg, toluenesulfonic acid or phenolsulfonic acid). The sulfonic acid catalyzes the reaction, while the exotherm causes the blowing agent, emulsified in the resin, to evaporate and expand the foam. The surfactant controls the cell size as well as the ratio of open-to-closed cell units. Both batch and continuous processes are employed. In the continuous process, the machinery is similar to that used for continuous polyurethane foam. The properties of the foam depend mainly on density and the cell structure.

The preferred phenol is resorcinol, however, other phenols of the kind which are able to form condensation products with aldehydes can also be used. Such phenols include monohydric and polyhydric phenols, pyrocatechol, hydroquinone, alkyl substituted phenols, such as, for example, cresols or xylenols; polynuclear monohydric or polyhydric phenols, such as, for example, naphthols, p,p'-dihydrexydiphenyl dimethyl methane or hydroxyanthracenes.

The phenols used to make the foam starting material can also be used in admixture with non-phenolic compounds which are able to react with aldehydes in the same way as phenol.

The preferred aldehyde for use in the solution is formaldehyde. Other suitable aldehydes include those which will react with phenols in the same manner. These include, for example, acetaldehyde and benzaldehyde.

In general, the phenols and aldehydes which can be used in the process of the invention are those described in U.S. Pat. Nos. 3,960,761 and 5,047,225, the disclosures of which are incorporated herein by reference.

The polymeric foam used as the starting material in the production of the inventive carbon foam should have an initial density which mirrors the desired final density for the carbon foam which is to be formed. In other words, the polymeric foam should have a density of about 0.1 to about 0.6 g/cc, more preferably about 0.1 to about 0.4 g/cc. The cell structure of the polymeric foam should be closed with a porosity of between about 65% and about 95% and a relatively high compressive strength, i.e., on the order of at least about 100 psi, and as high as about 300 psi or higher.

In order to convert the polymeric foam to carbon foam, the foam is carbonized by heating to a temperature of from about 500° C., more preferably at least about 800° C., up to about 3200° C., in an inert or air-excluded atmosphere, such as in the presence of nitrogen. The heating rate should be controlled such that the polymer foam is brought to the desired temperature over a period of several days, since the polymeric foam can shrink by as much as about 50% or more during carbonization. Care should be taken to ensure uniform heating of the polymer foam piece for effective carbonization.

By use of a polymeric foam heated in an inert or air-excluded environment, a non-graphitizing glassy carbon foam is obtained, which has the approximate density of the starting polymer foam, but a compressive strength of at least about 2000 psi and, significantly, a ratio of strength to density of at least about 7000 psi/g/cc, more preferably at least about 8000 psi/g/cc. The carbon foam has a relatively uniform distribution of isotropic pores having, on average, an aspect ratio of between about 1.0 and about 1.5.

The resulting carbon foam has a total porosity of about 65% to about 95%, more preferably about 70% to about 95% with a bimodal pore distribution; at least about 90%, more preferably at least about 95%, of the pore volume of the pores are about 10 to about 150 microns in diameter, more preferably about 15 to about 95 microns in diameter, most preferably about 25 to about 95 microns in diameter, while at least about 1%, more preferably about 2% to about 10%, of the pore volume of the pores are about 0.8 to about 3.5 microns, more preferably about 1 to about 2 microns, in diameter. The bimodal nature of the inventive foam provides an intermediate structure between open-celled foams and closed-cell foams, limiting the liquid permeability of the foam while maintaining a foam structure. Permeabilities less than 3.0 darcys, even less than 2.0 darcys, are preferred.

Typically, characteristics such as porosity and individual pore size and shape are measured optically, such as by use of an epoxy microscopy mount using bright field illumination, and are determined using commercially available software, such as Image-Pro Software available from MediaCybernetic of Silver Springs, Md.

In order to further illustrate the principles and operation of the present invention, the following example is provided. However, this example should not be taken as limiting in any regard.

EXAMPLE

A rectangular phenolic foam block with dimensions of 7.8 inches long, 3.9 inches wide and 2.9 inches thick is converted to carbon foam in the following manner. The starting phenolic foam has a density of 0.32 g/cc, and a compressive strength of about 300 psi. The foam is packed in a steel can, protected from air and then heated at 2° C. per hour to a temperature of 550° C. and then at 10° C. per hour to 900° C. and held for about 20 hours at that temperature. The resultant carbon foam obtained has a density of 0.336 g/cc and a compressive strength of 4206 psi, for a strength to density ratio of 12,517 psi/gm/cc. The thermal conductivity of the foam is measured as 0.3 W/m°K at 25° C. and the permeability is measured as 0.17 darcys.

The foam was examined by optical microscopy the porosity of the foam is measured as 79.5%. Two sets of pores are observed, and the pores appear round with fairly uniform diameters. An image analysis procedure is used to determine the average diameters and aspect ratios of the two different sets of pores. For the large size pores, with diameters above 25 microns, the calculated average diameter is 35 microns with a standard deviation of 24 microns. The pore aspect ratio is calculated as 1.16 showing they are essentially spherical. These large pores account for 96% of the pore volume of the total porosity. The finer size pores, which account for 4% of the pore volume of the total porosity, have an average diameter of 1.75 microns with a standard deviation of 0.35. The aspect ratio of these pores is measured as 1.10.

The pore structure of the foam is unique as compared to other foams in that it appears intermediate to a closed cell and open cell configuration. The large pores appear to be only weakly connected to each other by the fine porosity so that the foam exhibits permeability in the presence of water but does not readily absorb more viscous liquids.

A series of carbon foams is produced by using different density precursor materials. The properties of the products are listed below;

|  | Foam 1 | Foam 2 | Foam 3 |
| --- | --- | --- | --- |
| Density g/cc | 0.266 | 0.366 | 0.566 |
| Compressive Strength (psi) | 2263 | 4206 | 8992 |
| Compressive Strength/Density | 8,507 | 12,517 | 16,713 |

Accordingly, by the practice of the present invention, carbon foams having heretofore unrecognized characteristics are prepared. These foams exhibit exceptionally high compressive strength to density ratios and have a distinctive bimodal cell structure, making them uniquely effective at applications, such as composite tooling applications.

The disclosures of all cited patents and publications referred to in this application are incorporated herein by reference.

The above description is intended to enable the person skilled in the art to practice the invention. It is not intended to detail all of the possible variations and modifications that will become apparent to the skilled worker upon reading the description. It is intended, however, that all such modifications and variations be included within the scope of the invention that is defined by the following claims. The claims are intended to cover the indicated elements and steps in any arrangement or sequence that is effective to meet the objectives intended for the invention, unless the context specifically indicates the contrary.

What is claimed is:

1. A carbon foam article comprising a carbon foam having a compressive strength of at least about 2000 psi, a ratio of compressive strength to density of at least about 7000 psi/g/cc and a bimodal pore distribution wherein at least about 90% of the pore volume comprises pores having a diameter of between about 15 and about 95 microns and at least about 1% of the pore volume of the pores have a diameter of between about 0.8 and about 3.5 microns, and further wherein the carbon foam has a liquid permeability of no greater than about 3.0 darcys.

2. The article of claim 1 wherein the carbon foam has a ratio of compressive strength to density of at least about 8000 psi/g/cc.

3. The article of claim 2 wherein the carbon foam has a density of from about 0.05 to about 0.4 g/cc.

4. The article of claim 3 wherein the carbon foam has a porosity of between about 65% and about 95%.

5. The article of claim 4 wherein the pores of the carbon foam have, on average, an aspect ratio of between about 1.0 and about 1.5.

6. The article of claim 1 wherein from about 2% to about 10% of the pore volume of the pores have a diameter of about 1 to about 2 microns.

7. A carbon foam article comprising a carbon foam having a compressive strength of at least about 2000 psi, the carbon foam having a pore distribution such that at least about 90% of the pore volume of the pores have a diameter of between about 10 and about 95 microns and at least about 1% of the pore volume of the pores have a diameter of between about 0.8 and about 3.5 microns, wherein the carbon foam has a liquid permeability of no greater than about 3.0 darcys.

8. The article of claim 7 wherein at least about 95% of the pore volume of the pores have a diameter of between about 25 and about 95 microns.

9. The article of claim 8 wherein from about 2% to about 10% of the pore volume of the pores have a diameter of about 1 to about 2 microns.

10. The article of claim 7 wherein the carbon foam has a ratio of compressive strength to density of at least about 7000 psi/g/cc.

11. The article of claim 10 wherein the carbon foam has a ratio of compressive strength to density of at least about 8000 psi/g/cc.

12. The article of claim 11 wherein the carbon foam has a density of from about 0.05 to about 0.4 g/cc.

13. The article of claim 12 wherein the carbon foam has a porosity of between about 65% and about 95%.

14. The article of claim 13 wherein the pores of the carbon foam have, on average, an aspect ratio of between about 1.0 and about 1.5.

15. The article of claim 1 wherein the carbon foam is formed from a phenolic foam starting material.

16. The article of claim 7 wherein the carbon foam is formed from a phenolic foam starting material.

\* \* \* \* \*